(No Model.) 2 Sheets—Sheet 1.
W. PYLE.
DEVICE FOR LAYING CONDUCTOR WIRES IN UNDERGROUND CONDUITS.
No. 303,749. Patented Aug. 19, 1884.
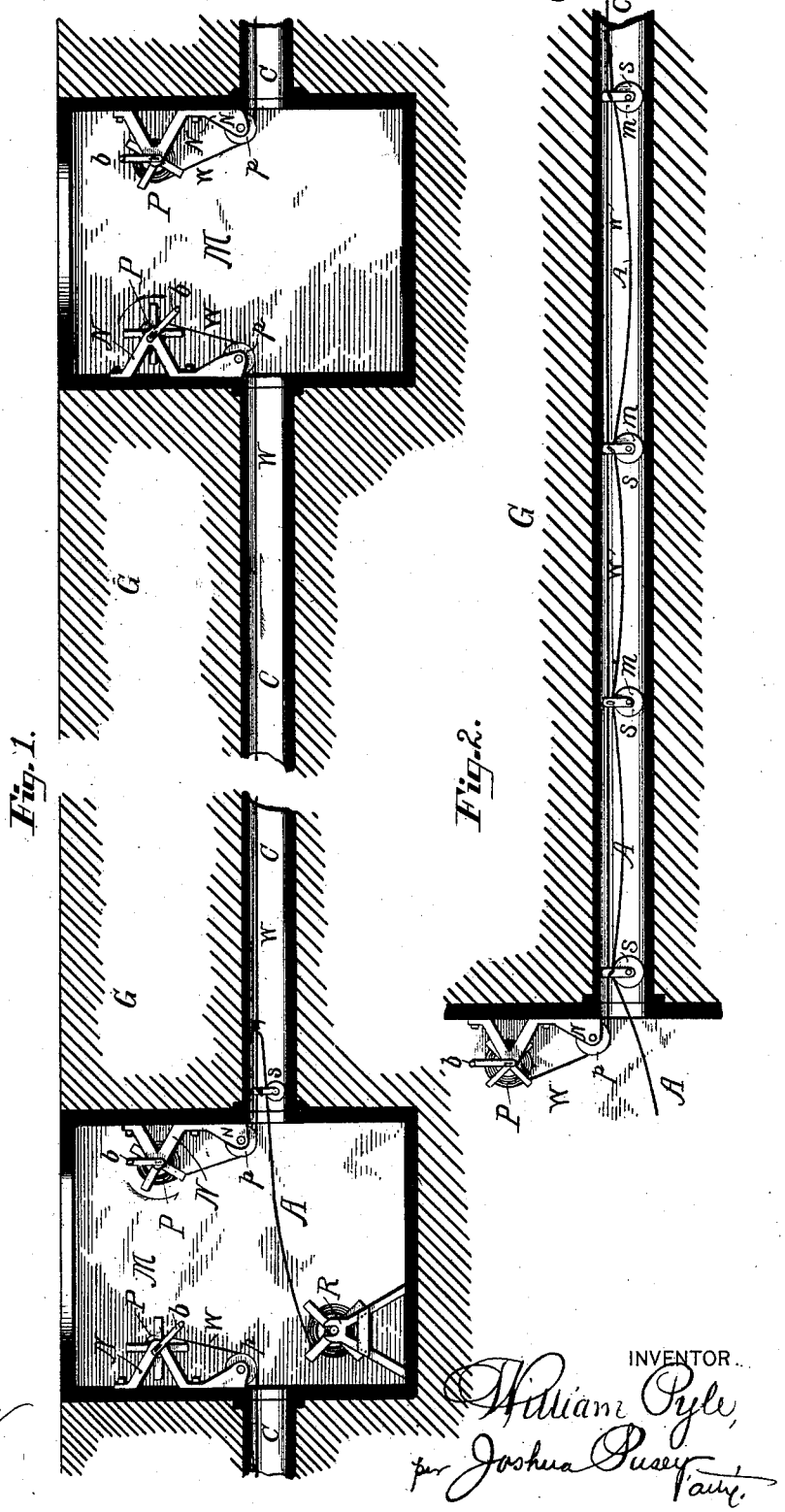
WITNESSES:
John Nolan
N Heulser
INVENTOR
William Pyle,
per Joshua Pusey
atty.

(No Model.) 2 Sheets—Sheet 2.
W. PYLE.
DEVICE FOR LAYING CONDUCTOR WIRES IN UNDERGROUND CONDUITS.
No. 303,749. Patented Aug. 19, 1884.
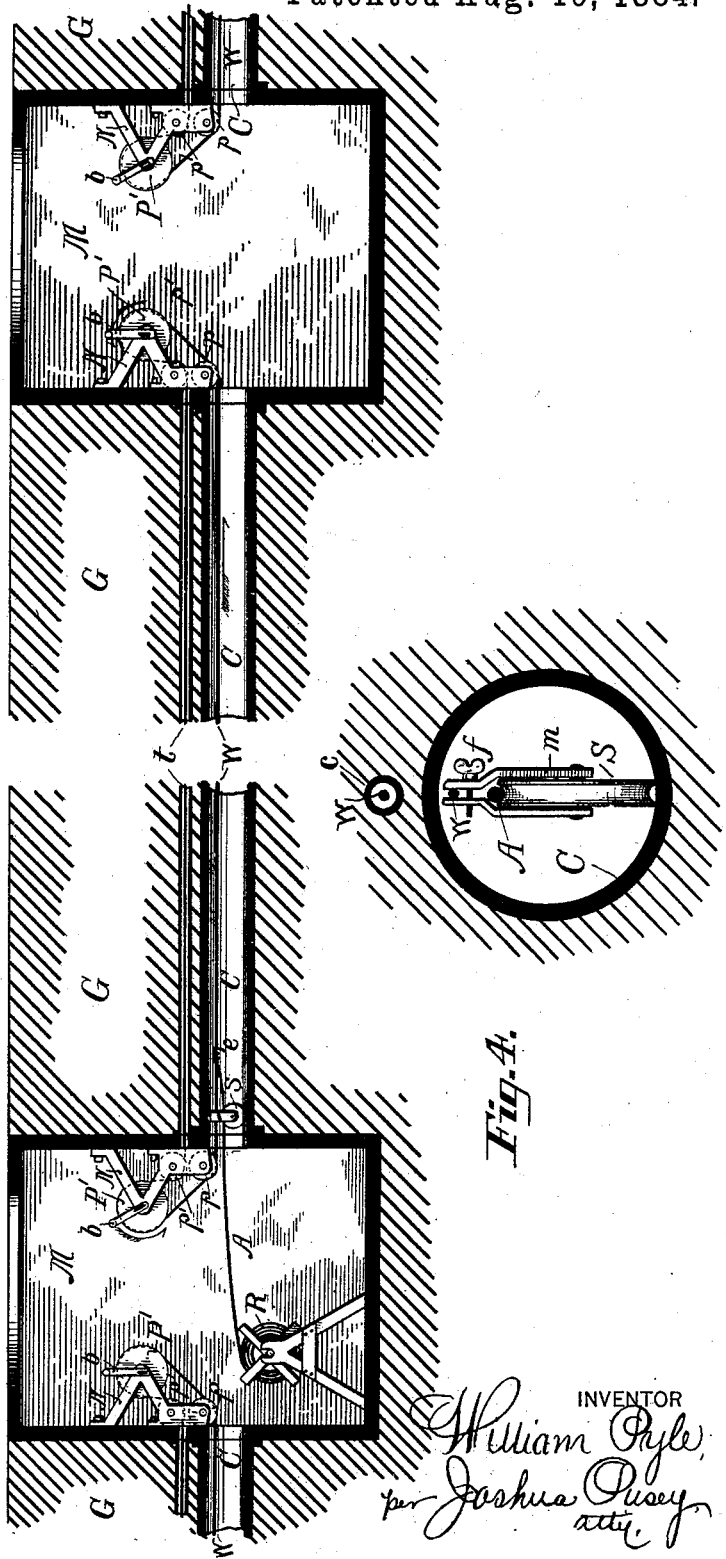
WITNESSES:
John Nolan
N. H. Culver
INVENTOR
William Pyle,
per Joshua Pusey, atty.

UNITED STATES PATENT OFFICE.

WILLIAM PYLE, OF WILMINGTON, DELAWARE.

DEVICE FOR LAYING CONDUCTOR-WIRES IN UNDERGROUND CONDUITS.

SPECIFICATION forming part of Letters Patent No. 303,749, dated August 19, 1884.

Application filed November 15, 1883. (No model.)

*To all whom it may concern:*

Be it known that I, WILLIAM PYLE, a citizen of the United States, residing at the city of Wilmington, in the county of New Castle and State of Delaware, have invented certain new and useful Improvements in Devices for Laying Conductor-Wires in Underground Conduits, of which the following is a full, clear, and exact description, reference being had to the accompanying drawings.

The nature of this my invention is an improved permanent apparatus for laying the usual insulated conductors or electric wires within underground conduits, whereby not only the first wire may be readily inserted therein, but others subsequently, from time to time, as occasion may require.

It consists in the introduction of an endless or practically endless pilot-wire within the conduit, which wire is mounted upon or passes over reels or pulleys journaled in brackets secured to the sides of the man-holes located at suitable distances apart and connecting with the conduit, whereby said pilot-wire may be caused to move forward by simply turning the reel or pulley in the proper direction, and thus carry the conductor-wire, thereunto attached, through the conduit-section between the man-holes.

The invention also consists in providing a means for supporting the conductor while being drawn through the conduit, in order to prevent abrasion of the insulated covering of the former against the side or bottom of the conduit.

It further consists in certain details of construction, which will hereinafter fully appear.

Two forms of the invention are shown in the accompanying drawings. The preferred form is that represented by the drawings on Sheet 1. Figure 1 is a longitudinal section through the man-holes and conduit. Fig. 2 is a like sectional view showing the mode of supporting the conductor-wire while being conducted through the conduit. Fig. 3, Sheet 2, is a section similar to that of Fig. 1, showing the modification of my invention, the same being an endless pilot-wire running over pulleys, the lower section of the wire passing through the upper portion of the conduit, and the upper section through a protecting-tube laid in the earth just above the conduit. Fig. 4, Sheet 2, is a transverse section of the conduit immediately in front of the supporting-sheave S, Fig. 3.

Referring first specially to Figs. 1 and 2, M marks the man-holes, and C the large pipe or conduit for containing the conductor-wires, sunk in the ground G the usual depth. A is the conductor-wire, to be laid wound upon a reel, R, in the man-hole. W is the pilot-wire extending through the section of conduit, the ends of which wire are wound upon reels P, having hand-cranks *b* for turning the same, and journaled, one at each end of the conduit, in a bracket, N, which is secured to the side of the man-hole, preferably above the mouth of the conduit. Wire W passes under sheaves *p*, also journaled in said brackets, at the lower ends thereof, in a manner as shown, whereby the pilot-wire is kept free to move without coming in contact with the top of the inside of the conduit. It will be obvious that by turning the forward one of the two reels P in the proper direction the wire W will unwind from the opposite reel and will advance in the conduit, and by turning the latter reel in the opposite direction the wire will retrograde, winding up on the one reel and unwinding from the other. The total length of the wire should of course be somewhat in excess of double the length of the conduit-section.

The pilot-wire and reels and sheaves are designed to remain as permanent fixtures, so that conductor-wires may be inserted from time to time, as occasion may require.

In using the device I secure the free end of the conductor A to the wire W by twisting it around the latter, as shown, and then rotate the forward reel, and thus the conductor-wire will be carried through the conduit-section. In order to prevent any abrasion of the insulating-covering of the conductor, which might otherwise occur by rubbing against the bottom or side of the conduit, I make use of a series of easily attachable and detachable supporting-sheaves S. These are secured to the pilot-wire by means, preferably, of a forked bracket, *m*, provided with a thumb-screw, *f*, whereby the bracket is clamped firmly to wire W, as shown in the detail, Fig. 4. The lower part of the sheave rests upon the bottom of the conduit, as seen in the drawings. Before clamping the sheave-bracket to the pilot-wire I introduce the end of the conductor-wire between the forks of the bracket, so that the latter wire will rest within the groove of the face of the sheave; and as the reel is turned, and the pilot-wire thereby advanced, I attach, in a similar manner, at suitable intervals, additional supporting-sheaves, as shown in Fig. 2. As each successive sheave, having traversed the length of the section of conduit, arrives at the end thereof it is detached from the wires just before it can reach the sheave $p$; otherwise it would come into contact with the latter.

It is evident that my invention is equally useful when it is necessary to remove any conductor-wire from the conduit in order to examine or repair the same.

The conductor-wire sections may be joined together as soon as laid in the usual manner, and each section of the conduit between the man-holes is provided with my described permanent wire-laying devices.

The modification shown by Fig. 3, Sheet 2, differs from the form illustrated by Figs. 1 and 2 only in that the pilot-wire W is an endless wire running over grooved pulleys P', similarly placed as the reels P in Figs. 1 and 2. The return of the wire passes over directing-sheaves $p'$ and through a tube, $c$, laid in the earth just above the conduit C. In laying the conductor-wires they are first secured to the endless pilot-wire in the manner previously described, and the supporting-sheaves S are applied and operate in the same way.

Having thus described my invention, I claim as new and useful and wish to secure by Letters Patent—

1. The means herein shown for laying wires under ground, consisting of a conduit provided with a pilot-wire, a sheave mounted above the opening in each end of the conduit, and a hand-reel in close proximity to the sheave, whereby said pilot-wire may be moved in the upper part of the conduit and kept taut, substantially as described, and for the purposes set forth.

2. The means herein shown for laying wires under ground, consisting of a conduit provided with a pilot-wire, a sheave mounted above the opening at each end of the conduit, and a hand-reel in close proximity to the sheave, in combination with rotatable supporting-sheaves, and means whereby said sheaves may be engaged to and disengaged from the pilot-wire and the conductor-wire carried from one end of the conduit to the other, substantially as set forth.

3. In combination with the conduit and the described pilot-wire and actuating reels or pulleys, the detachable supporting-sheaves S, substantially as and for the purpose described.

4. The means herein shown for laying underground wires, consisting in a conduit having open ends, a pilot-wire running through said conduit, and means whereby said wire may be moved through the conduit, in combination with rotatable supporting-sheaves, and means whereby said sheaves may be attached to the pilot-wire and drawn through the conduit, substantially as described, and for the purposes set forth.

In testimony whereof I have hereunto affixed my signature this 7th day of November, A. D. 1883.

WILLIAM PYLE.

Witnesses:
JOHN NOLAN,
FRANCIS S. BROWN.